United States Patent [19]

Kameyama

[11] Patent Number: 5,363,161
[45] Date of Patent: Nov. 8, 1994

[54] SEQUENTIAL TAKING CAMERA WITH PLURAL LENSES

[75] Inventor: Nobuyuki Kameyama, Tokyo, Japan

[73] Assignee: Fuji Photo Film Co., Ltd., Kanagawa, Japan

[21] Appl. No.: 968,690

[22] Filed: Oct. 30, 1992

[30] Foreign Application Priority Data

Oct. 30, 1991 [JP] Japan .................. 3-285175

[51] Int. Cl.⁵ .............................................. G03B 35/08
[52] U.S. Cl. ................................................. 354/114
[58] Field of Search ............... 354/114, 120, 121, 110

[56] References Cited

U.S. PATENT DOCUMENTS

| | | | |
|---|---|---|---|
| 3,114,306 | 12/1963 | Nieuwenhoven et al. | 354/120 |
| 3,202,069 | 8/1965 | Cummins et al. | 354/114 |
| 4,140,381 | 2/1979 | Douglas | 354/111 |
| 4,621,915 | 11/1986 | Klainos | 354/121 |
| 5,136,319 | 8/1992 | Ushiro et al. | 354/114 |
| 5,210,557 | 5/1993 | Kameyama et al. | 354/120 |

FOREIGN PATENT DOCUMENTS 2-105132 4/1990 Japan .
2291541 12/1990 Japan .
3150545 6/1991 Japan .

Primary Examiner—Michael L. Gellner
Assistant Examiner—Nicholas J. Tuccillo
Attorney, Agent, or Firm—Young & Thompson

[57] ABSTRACT

A sequential taking camera has four exposure chambers arranged in a horizontal line along the transporting direction of a photographic film, and four taking lenses in alignment with the four exposure chambers. Front and rear shutter disks are superposed one upon the other. Each of the front and rear shutter disks is formed with two shutter openings. The front shutter disk is formed with a slot, and the rear shutter disk is formed with a pin which slides in the slot. The rear shutter disk first rotates relative to the front shutter disk a distance corresponding to the length of the slot. A shutter drive plate moves from an initial position to a cocked position in response to the operation of a film winding wheel, and is locked in the cocked position by a stop lever. The shutter drive plate actuates the rear shutter disk, and while it moves from the initial position to the charge position, the front and rear shutter disks rotate together while maintaining the disk shutter openings out of alignment. While the shutter drive plate returns from the cocked position to the initial position quickly under the force of a spring, the front and rear shutter disks rotate together while maintaining the shutter disk openings superposed. The four exposure chambers sequentially pass through an open/closed state to create four original sub-frames at a predetermined time interval on an original frame of panoramic size.

20 Claims, 11 Drawing Sheets

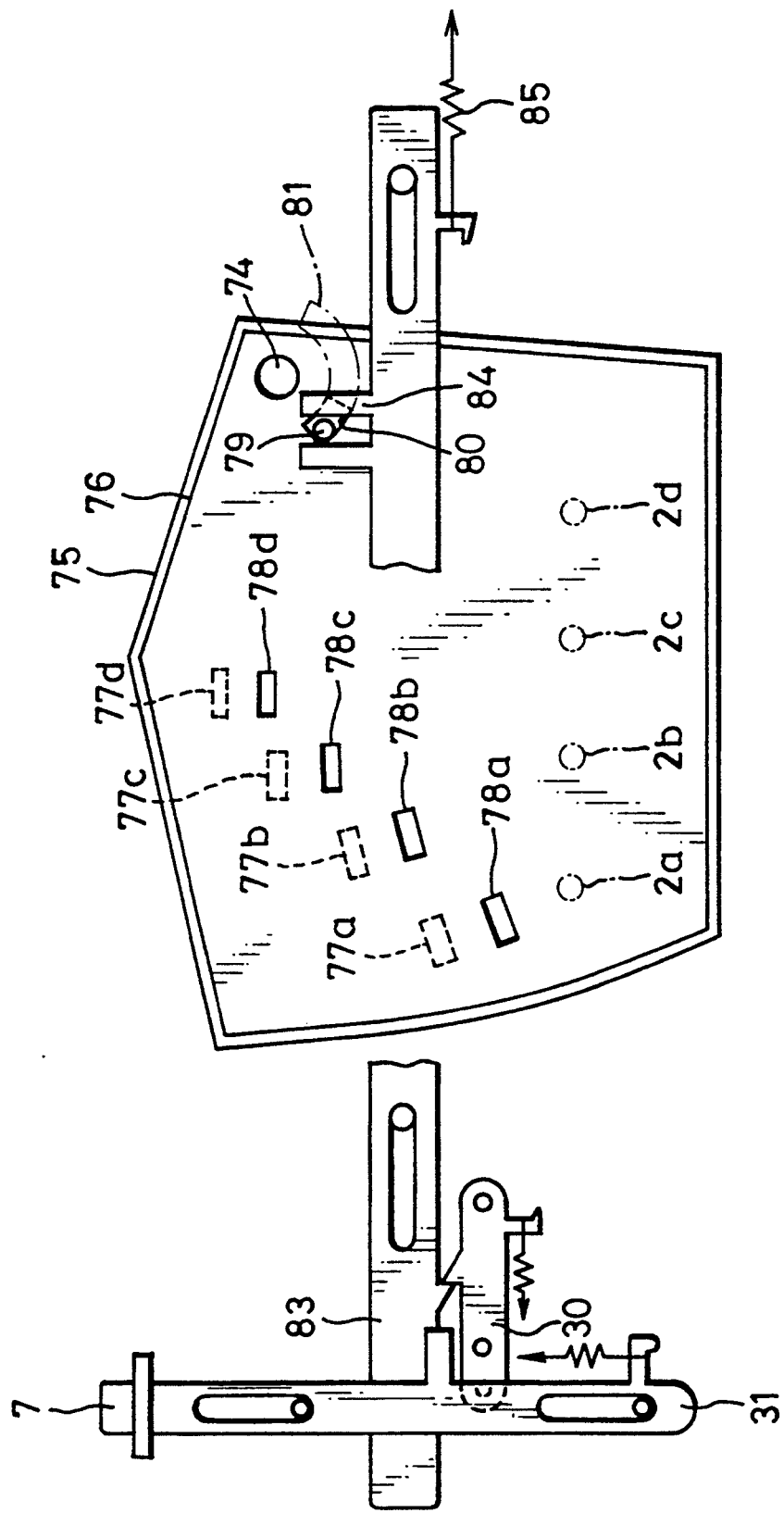

SEQUENTIAL TAKING CAMERA WITH PLURAL LENSES

BACKGROUND OF THE INVENTION

1. Field of the Invention

The present invention relates to a sequential taking camera adapted to take pictures sequentially, which can take the same subject a plurality of times at a predetermined time interval upon one release of the shutter, and more particularly to an improved shutter mechanism to be used with such a camera.

2. Description of the Related Art

A sequential taking camera is very convenient in the field of sports such as golf, tennis and baseball since the position or physical form of a subject at various times can be recorded as still images. This type of camera is sold in Japan under the name SEQUENTIAL TAKING CARDIA BYUN by Fuji Photo Film Co., Ltd. This camera has eight taking lenses and creates eight original sub-frames (13×9 mm) at a predetermined time interval on an area corresponding to the size of two panoramic size frames (e.g. each 13×36 mm) of a photographic film, consecutively from one end to the other end of the area. Such sequential taking cameras are disclosed in commonly assigned copending U.S. applications Ser. Nos. 07/746,889 and 07/946,097, filed Aug. 19, 1991 and Sep. 17, 1992, respectively. From a photographic film with images taken by this camera, panoramic size photoprints (e.g., 254×89 mm) each having four print sub-frames can be produced by taking advantage of the availability of panoramic print services. The position, physical form or the like of a subject can be checked by observing the eight print sub-flames of two panoramic-size photoprints placed side by side.

The sequential taking camera described above is provided with a shutter mechanism having two shutter disks and a stepping motor. Upon depression of the shutter button, the stepping motor is started, so as to rotate the two shutter disks. These shutter disks each having movable shutter openings or slits, operate to sequentially open and close eight stationary shutter openings or slits formed in the shutter base plate to take the same subject eight times with a predetermined time interval. This shutter mechanism requires the stepping motor, a motor control circuit, and a battery, thereby posing a problem that the camera cannot be made compact and the camera manufacturing cost becomes high.

OBJECTS OF THE INVENTION

It is accordingly an object of the present invention to provide a sequential taking camera having a shutter mechanism whose structure is simple and whose manufacturing cost is low.

It is another object of the present invention to provide a sequential taking camera which is compact in size.

SUMMARY OF THE INVENTION

The above and other objects of the present invention are achieved by the provision of a sequential taking camera which has shutter drive means that are moved from an initial position to a cocked position in response to the operation of a film winding member and that are returned quickly to the initial position upon a shutter release operation. A shutter base plate is disposed between a plurality of exposure chambers and a plurality of taking lenses and is formed with a plurality of stationary shutter openings corresponding in number and position to the taking lenses. At least one shutter disk is provided near the shutter base plate. The shutter disk assumes a first position when the shutter drive means is in the initial position, and assumes a second position when the shutter drive means is in the cocked position. The shutter disk has a plurality of movable shutter openings which operate to sequentially open and close the plurality of stationary shutter openings only when the shutter disk rotates from the second position to the first position. The shutter drive means includes a slidable shutter drive lever for rotating the shutter disk, and a spring for moving the shutter drive lever to the initial position.

According to a preferred embodiment of the present invention, there are provided front and rear shutter disks superposed one upon the other, the rear shutter disk moving in response to the operation of the shutter drive lever, and the front shutter disk rotating, by means of associated operating means, following the rotation of the rear shutter disk. Each shutter disk has two movable shutter openings which operate to sequentially open and close the four stationary shutter openings. The associated operating means allows the rear shutter disk to rotate relative to the front shutter disk within a predetermined angle range during the initial stage of the rotation of the rear shutter disk. As the rear shutter disk rotates from the first position to the second position, the rear shutter disk rotates relative to the front shutter disk while maintaining the two pairs of movable shutter openings out of superposition with each other so as not to expose the photographic film to light. As the rear shutter disk rotates from the second position to the first position, the rear shutter disk rotates relative to the front shutter disk while maintaining the two pairs of movable shutter openings superposed so as to expose the photographic film to light. During this rotation, four original sub-frames are sequentially created on the area corresponding in size to one panoramic size original frame.

According to another preferred embodiment of the present invention, two pairs of shutter disks are used which are disposed side by side with associated operation relation with each other. In this case, eight original sub-frames are sequentially created on the area corresponding in size to two panoramic-size original frames.

According to the present invention, since the shutter disks are charged in response to the operation of film winding, it is unnecessary to use a motor, a motor controller, and a battery, providing a compact and inexpensive sequential taking camera.

BRIEF DESCRIPTION OF THE DRAWINGS

The above and other objects and advantages of the invention will become apparent from the following detailed description of the preferred embodiments when read in conjunction with the accompanying drawings, wherein:

FIG. 15 is an explanatory view showing the positional relationship between the two shutter disks of FIG. 13 when the shutter mechanism has been cocked.

DETAILED DESCRIPTION OF THE PREFERRED EMBODIMENTS

Figure 1:
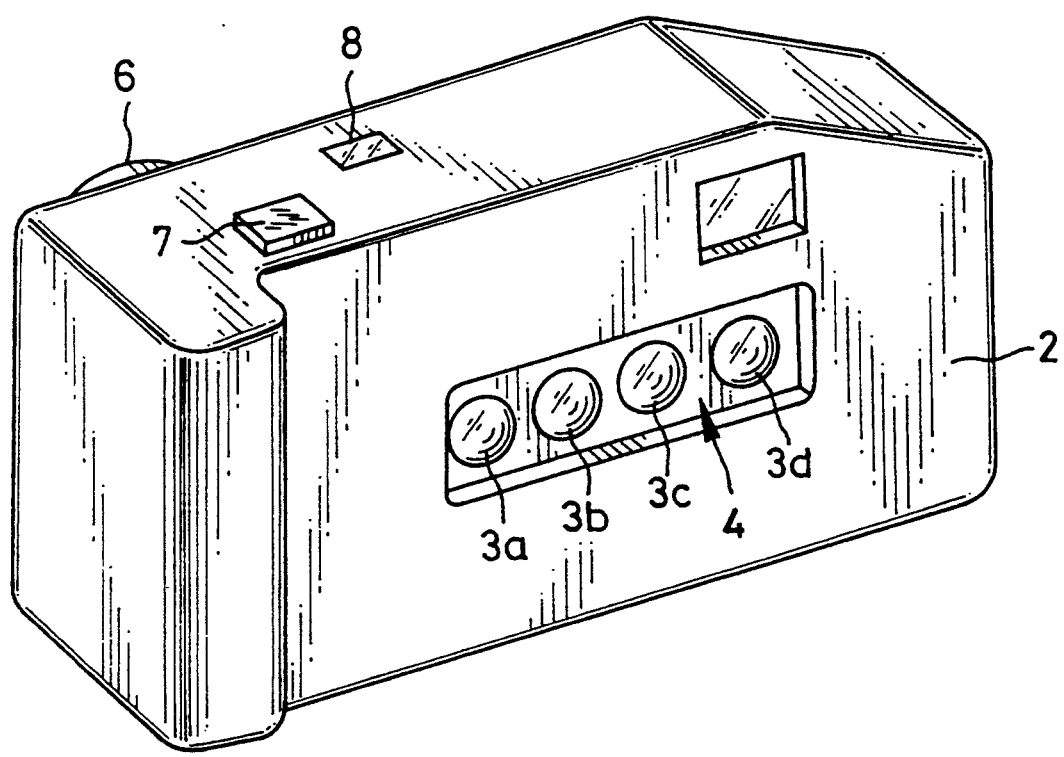
FIG. 1 is a perspective view showing a sequential taking camera having four taking lenses according to a first embodiment of the present invention.

Referring to FIG. 1 showing a sequential taking camera 2 which can sequentially take four pictures, four taking lenses 3a to 3d are mounted in a horizontal row on the front side of the sequential taking camera 2. The optical axes L1 to L4 (refer to FIG. 2) of the taking lenses 3a to 3d are parallel. The taking lenses 3a to 3d are formed integrally on a single lens plate 4 molded from transparent resin such as acrylic resin. On the rear side of the sequential taking camera 2, there is provided a winding wheel 6 for winding a photographic film and charging the shutter. Reference numerals 7 and 8 represent a shutter button and a film counter, respectively.

Figure 2:
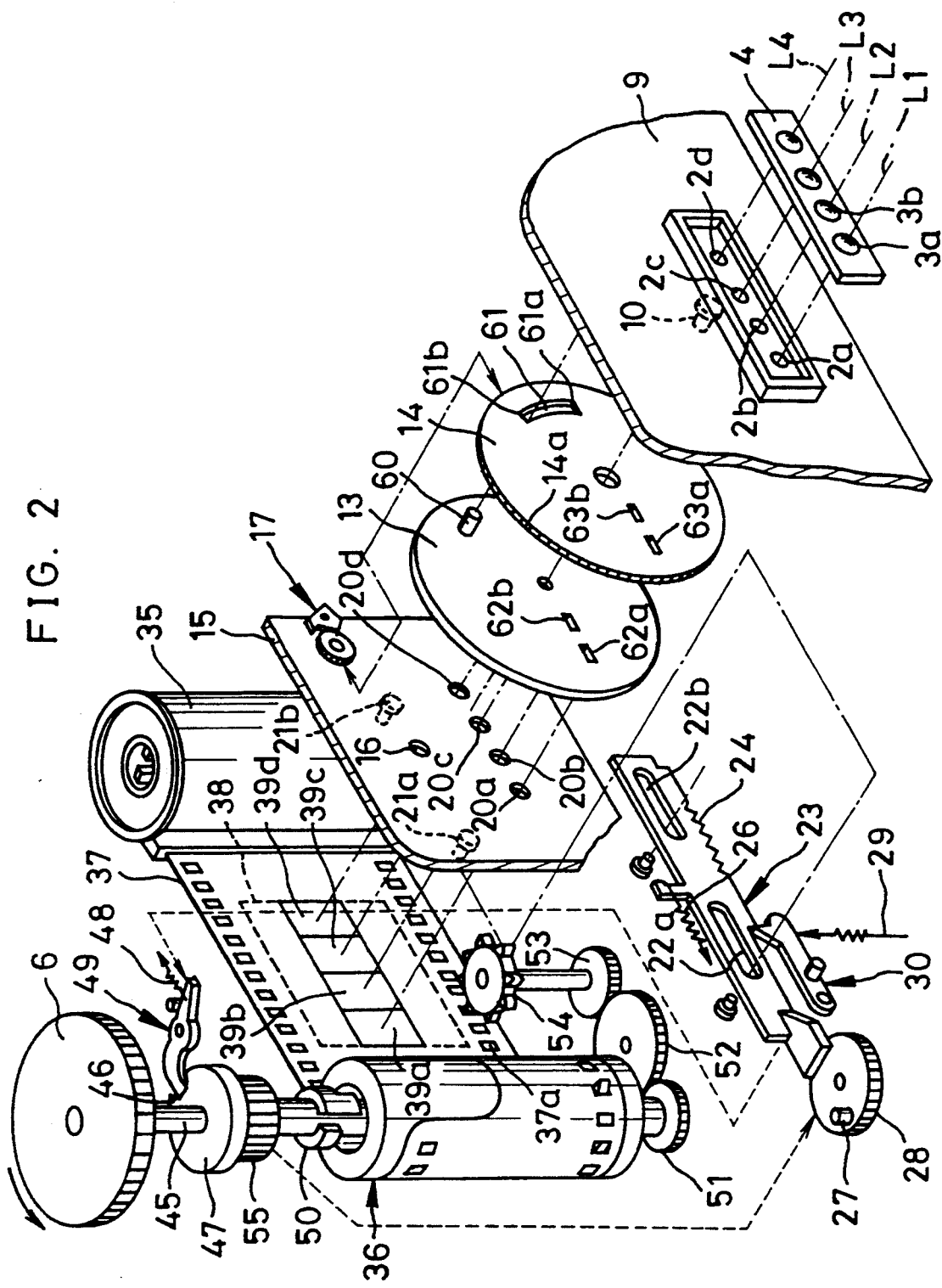
FIG. 2 is an exploded perspective view showing the main parts of the sequential taking camera shown in FIG. 1.

Referring to FIG. 2, a shutter base plate 9 is formed with four stationary shutter openings 2a to 2d in correspondence with the taking lenses 3a to 3d, the stationary shutter openings having the same diameter as each other. The stationary shutter openings 2a to 2d are sequentially opened and closed at a predetermined time interval as rear and front shutter disks 13 and 14 rotate. The shutter disks 13 and 14 are rotatably mounted on a shaft 10 formed on the shutter base plate 9.

A shutter box 15 (see FIG. 4) with its forward side open is provided for housing the shutter disks 13 and 14 in a light-shielded state in combination with the shutter base plate 9, which closes the forward side of box 15. The shutter box 15 is formed with four openings 20a to 20d corresponding in position to the optical axes L1 to L4, the openings having the same diameter as each other.

It is necessary to make constant the amount of light passing through each opening 20a to 20d, and this is done by making the speed of rotation of the front shutter disk 14 constant. To this end, a governor 17 is provided. As is well known in the art, the governor 17 is provided with a gear (not shown) meshing with teeth 14a formed on the outer periphery of the front shutter disk 14, an escapement wheel mounted coaxially with the gear, and a pawl engaging intermittently with the escapement wheel. The governor 17 also performs the function of preventing the front shutter disk 14 from moving unnecessarily in the initial position or cocked position.

Figure 4:
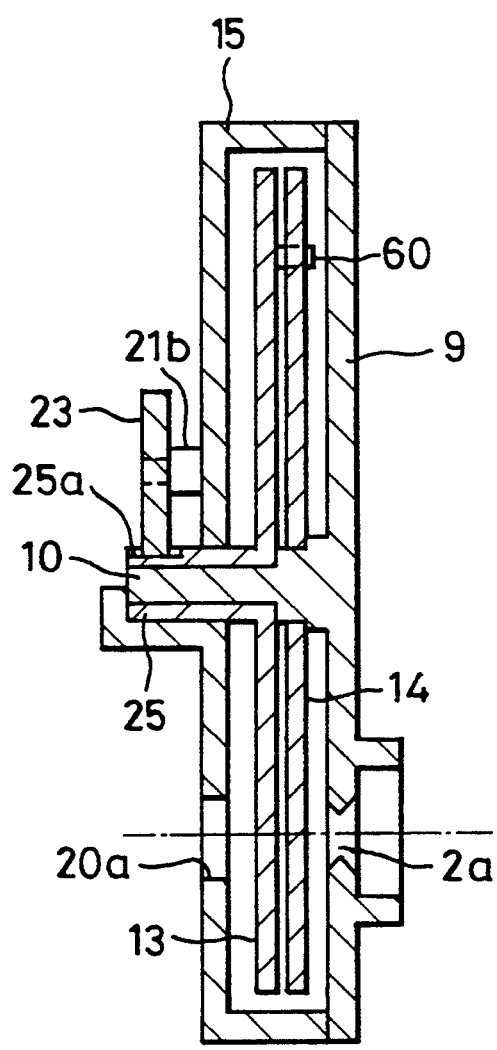
FIG. 4 is a cross sectional view showing the shutter base plate, the shutter box, and the shutter disks.

As illustrated in FIG. 4, the rear shutter disk 13 is integrally formed with a sleeve shaft 25 which is rotatably mounted on the shaft 10, the sleeve shaft being formed with a plurality of teeth 25a partway about the outer periphery thereof. The sleeve shaft 25 and shaft 10 extend rearward through an opening 16 formed in the shutter box 15.

Figure 5:
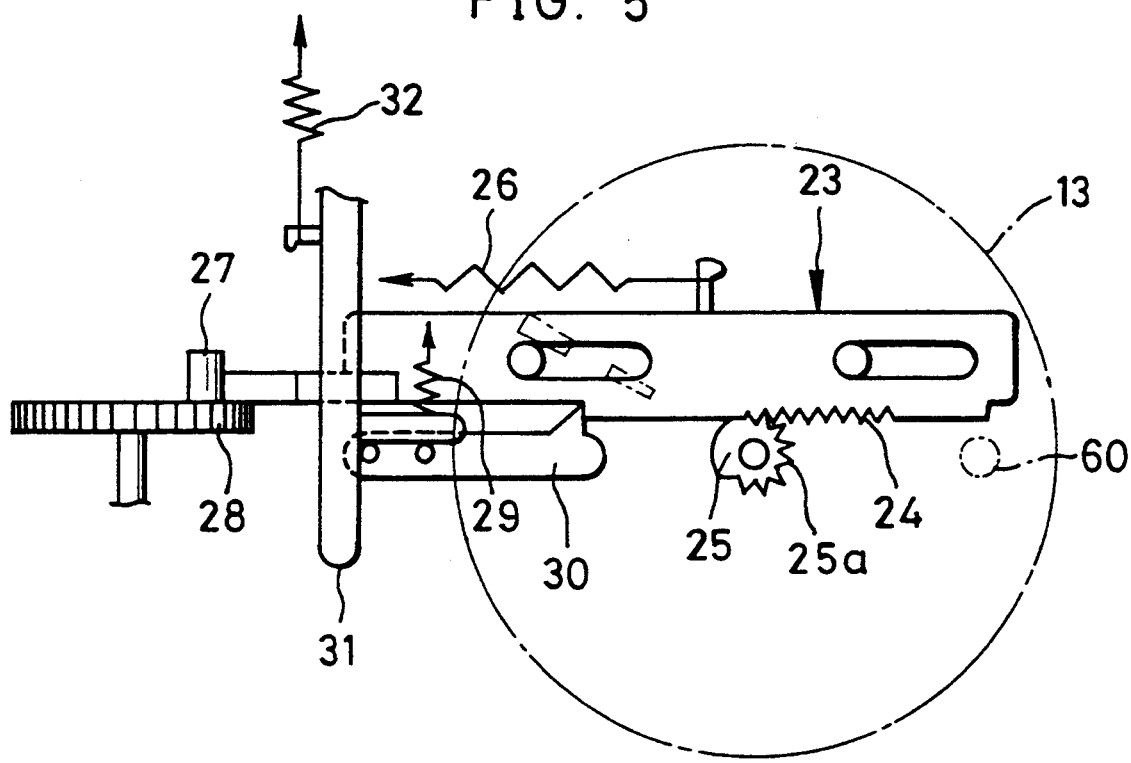
FIG. 5 is an explanatory view showing the positional relationship between the shutter drive plate and the rear shutter disk when the shutter mechanism has been cocked.
Figure 6:
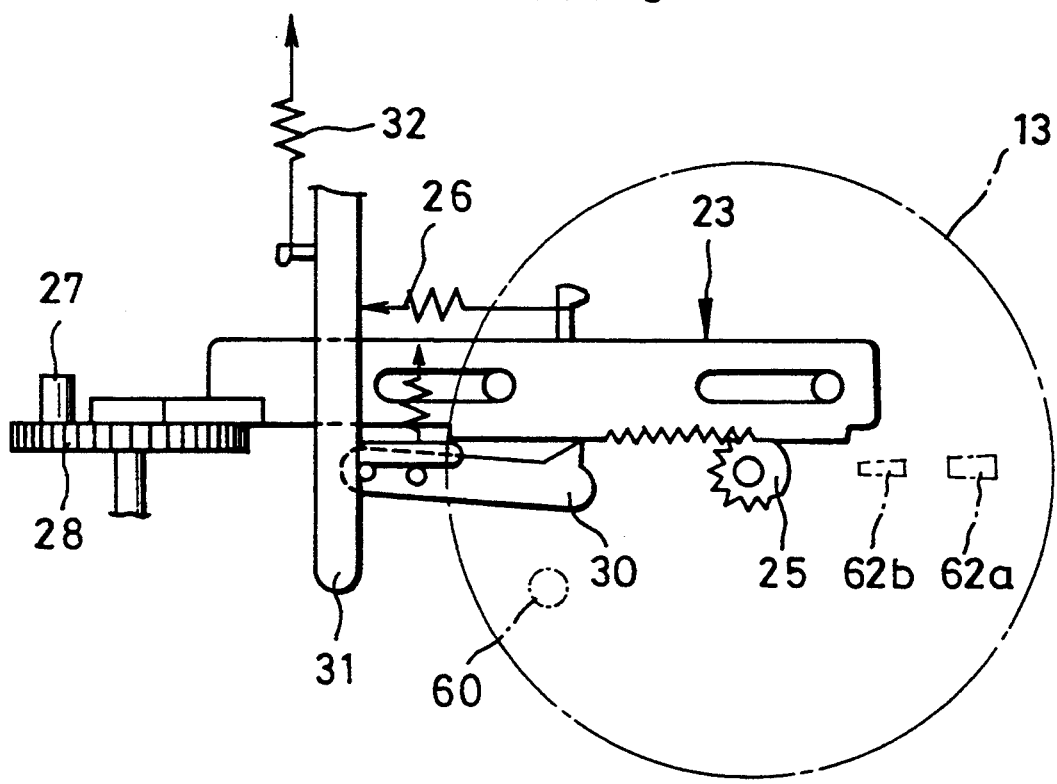
FIG. 6 is an explanatory view showing the positional relationship between the shutter drive plate and the rear shutter disk before the shutter mechanism is cocked.

A pair of rearwardly extending pins 21a and 21b are embedded in the shutter box 15. The pins 21a and 21b engage with a shutter drive plate 23 slidable in the lateral horizontal direction via a pair of slots 22a and 22b in which the pins 21a and 21b are respectively slidably received. The shutter drive plate 23 is formed with a rack 24 engaging with the teeth 25a of the sleeve shaft 25, as illustrated in FIGS. 5 and 6. During the cocking operation of the shutter mechanism, a gear 28 rotates once as the winding wheel 6 is rotated. During this rotation, a pin 27 on gear 28 pushes one end of the shutter drive plate 23 to move it to the right (FIG. 5) against the force of a spring 26. When the shutter drive plate 23 is moved to the cocked position shown in FIG. 5, it is held in this position by a top lever 30 urged in the counterclockwise direction by a spring 29. When the shutter button 7 is depressed, the stop lever 30 rotates in the clockwise direction to free the shutter drive plate 23.

Positioned to the rear of the shutter box 15 is a photographic film 37 pulled out of a cassette 35 and with its leading end captured by a film take-up reel 36. An area 38 indicated by a broken line on the film 37 in FIG. 2 corresponds to a full-size original frame (36×24 mm) of 35 mm-type film. Four original sub-frames 39a to 39d of the same subject are momentarily created sequentially at a predetermined time interval. The size of each original sub-frame 39a to 39d is 9×13 mm, and the total size of the four original sub-frames 39a to 39d is 36×13 mm, which is the same as that of a panoramic original frame.

A winding stop cam 47 (FIG. 2) with a recess 46 formed therein is fixedly mounted on the shaft 45 of the winding wheel 6. A winding stop lever 49 which is urged in the counterclockwise direction by a spring 48 is in contact with the winding stop cam 47. The winding stop lever 49 drops into and engages with the recess 46 when the winding operation is to be stopped, so that the winding wheel 6 is locked to prevent a further rotation thereof. The winding stop lever 49 moves out of the recess 46 when it is pushed and rotated in the clockwise direction by the shutter drive plate 23, thereby releasing the locked state of the winding wheel 6.

The film take-up reel 36 is mounted on the shaft 45 via a friction ring 50, and a gear 51 is fixedly mounted on the shaft 45 at its lower end. The rotation force of the shaft 45 is transmitted to a gear 53 via a gear 52 meshing with the gear 51 to drive a sprocket wheel 54. As the sprocket wheel 54 engaging with perforations 37a of the photographic film 37 rotates, the film 37 is pulled out of the cassette 35 and advanced toward the film take-up reel 36. A gear 55 is integrally formed under the winding stop cam 47, the rotation force of the gear 55 being transmitted to the gear 28. The rotation ratio of the gear 55 to the gear 28 is 1:1. Although not shown, a conventional reverse rotation preventing mechanism is mounted near the film take-up reel 36. This mechanism is, for example, a spring plate or the like engaging with a knurled portion formed at the periphery of the film take-up reel 36 in the manner of a one-way pawl.

A tandem operating mechanism is provided between the two shutter disks. With this tandem mechanism, the rear shutter disk 13 rotates relative to the front shutter disk 14 through only a predetermined angle, and thereafter the front shutter disk 14 is driven in rotation by the rear shutter disk 13. This tandem operating mechanism is comprised by a forwardly extending pin 60 formed on the rear shutter disk 13 and a circular slot 61 in the front shutter disk 14. When the rear shutter disk 13 is rotated in the clockwise direction as seen in FIG. 2, the pin 60 pushes an end 61a of the slot 61, whereas on the other hand when the rear shutter disk 13 is rotated in the counterclockwise direction, it pushes an end 61b of the slot 61, in each case after a predetermined period of lost motion as pin 60 moves lengthwise of slot 61.

Two spaced rectangular movable shutter openings or slits 62a and 62b are formed in the rear shutter disk 13 in radial alignment, i.e. on a line passing through the axis of rotation of the disk 13. Similarly, two radially aligned shutter openings or slits 63a and 63b are formed in the front shutter disk 14. The shutter openings 62a and 63a, and 62b and 63b are respectively superposed only when the pin 60 is in contact with the end 61b of the slot 61.

Alternatively, the movable shutter openings 62a and 62b, and 63a and 63b need not be formed in radial alignment, but rather their positions may be angularly shifted, so long as the proper image taking timing is observed. But it remains true in this case, that the movable shutter openings 62a and 62b and the movable shutter openings 63a and 63b are superposed when the pin 60 is in contact with the end 61b of the slot 61.

The range, i.e. the length in the radial direction of the shutter disk, of each of the movable shutter openings 62a, 62b, 63a, and 63b is equal to or greater than the diameter of the openings 20a to 20d. Since the rotation speed of the movable shutter openings 62a and 63a on the outer side is greater than that of the movable shutter openings 62b and 63b on the inner side, the width of the former is greater than that of the latter. The same exposure amount of the four original sub-frames 39a to 39d is thus ensured.

Figure 3:
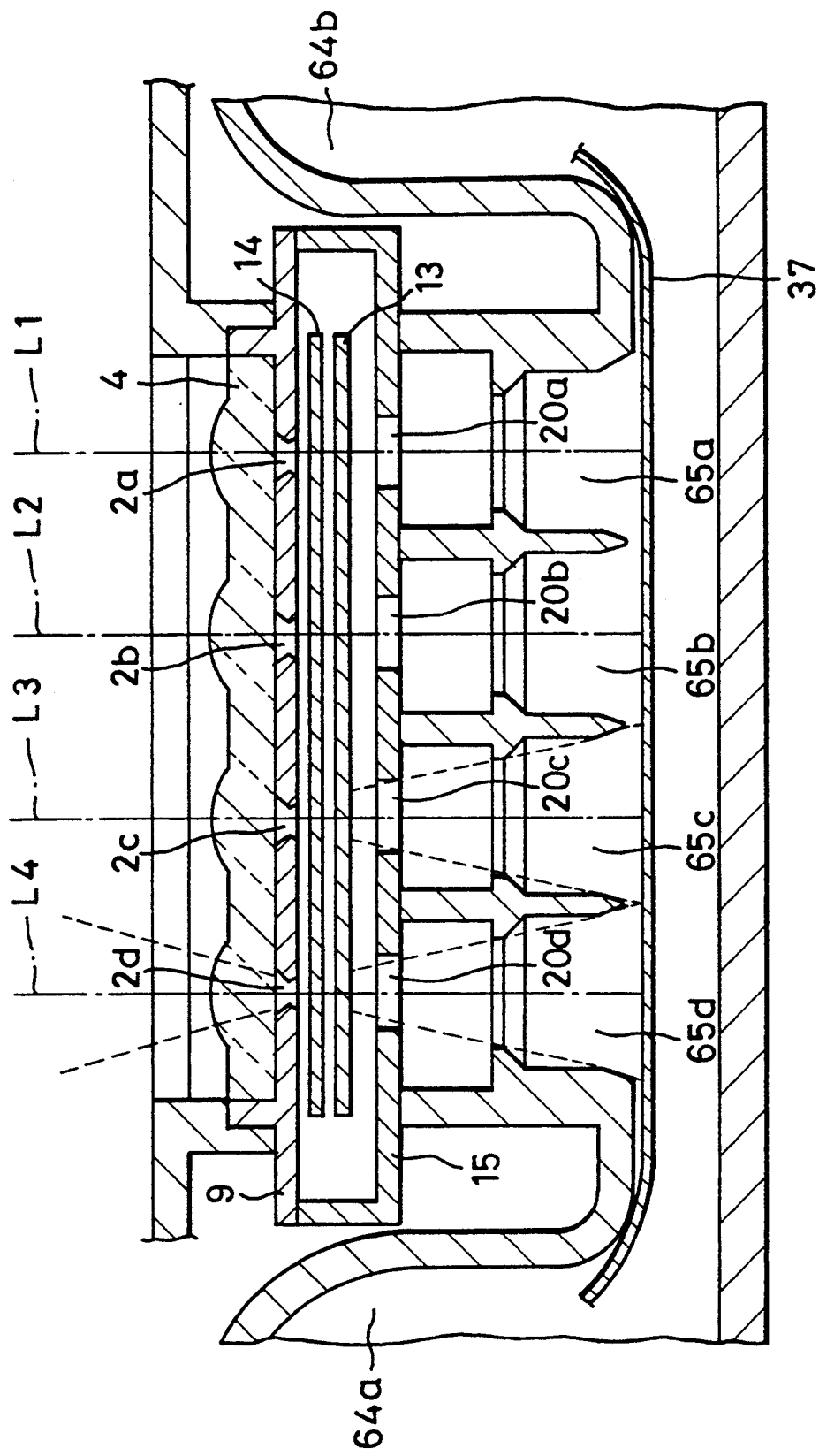
FIG. 3 is a cross sectional view showing the main parts of the sequential taking camera.

Referring now to FIG. 3, four exposure chambers 65a to 65d separated by partition walls are provided, juxtaposed in the feed direction of the photographic film 37 between a cassette receiving chamber 64a in which the cassette 35 is loaded and a film take-up chamber 64b. The exposure apertures determining the sizes of the four original sub-frames 39a to 39d are defined by the rear sides of the exposure chambers. The rear edges of the partition walls are spaced apart from the photographic film 37 so as not to make the borders between the original sub-frames appear as black areas on the photoprint.

Next, the operation of the sequential taking camera of this embodiment constructed as above will be described. First, the winding wheel 6 is rotated in the direction of the arrow shown in FIG. 2 to wind up the photographic film 37 by one frame and to cock the shutter. As the winding wheel 6 rotates, the film take-up reel 36 rotates by means of the friction clutch 50 and the sprocket wheel 54 rotates by means of the gears 51, 52 and 53. Upon rotation of the film take-up reel 36 and sprocket wheel 54, the photographic film 37 is fed out of the cassette 35 and wound about the film take-up reel 36. After the photographic film 37 is thus advanced by one frame, the winding stop lever 49 engages in the recess 46 of the winding stop cam 47 to prevent further rotation of the winding wheel 6. The rotation of the winding wheel 6 is transmitted to the gear 28 via the gear 55, so that the pin 27 on the gear 28 moves the shutter drive plate 23 to the right against the force of the spring 26. When the shutter drive plate 23 reaches the cocked position, it is locked by the stop lever 30.

Figure 9:
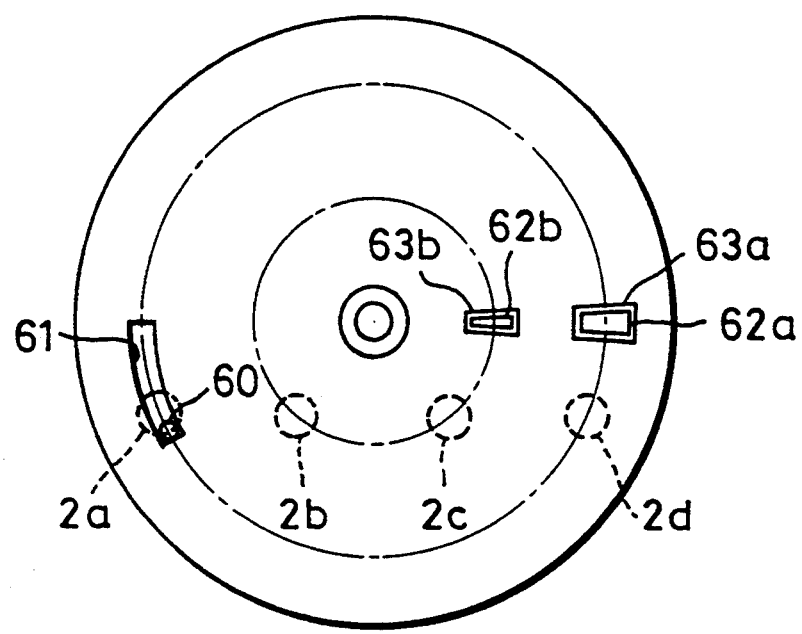
FIG. 9 is a diagram showing the positional relationship between the two shutter disks when the sequential image taking is completed.
Figure 10:
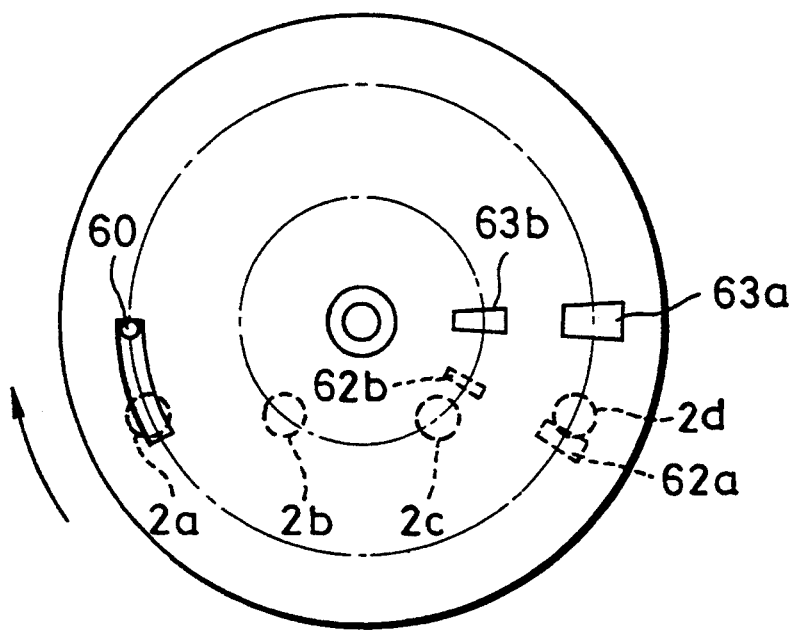
FIG. 10 is a diagram showing the positional relationship between the two shutter disks during the film winding operation.

While the shutter drive plate 23 moves from the initial position to the charge position, the rack 24 of the shutter drive plate 23 meshes with the gear 25a of the shaft 25 and rotates the latter in the clockwise direction. As a result, the rear shutter disk 13 rotates in the clockwise direction from the initial position shown in FIG. 9. During the initial stage of this rotation, the pin 60 slides within the slot 61, while the front shutter disk 14 remains stationary. When the rear shutter disk 13 rotates to the position shown in FIG. 10, the pin 60 comes into contact with the end 61a and the front shutter disk 14 starts rotating, driven by the rotation of the rear shutter disk 13. During this rotation, the movable shutter openings 62a and 62b, and 63a and 63b are displaced from each other without being superposed one upon another. Therefore, the stationary shutter openings 2a to 2d and openings 20a to 20d are closed by one of the shutter disks 13 and 14, so that the photographic film 37 will not be exposed to light. Maintaining this state, the shutter disks 13 and 14 rotate together in the clockwise direction, and are set to the cocked position shown in FIG. 7.

Figure 7:
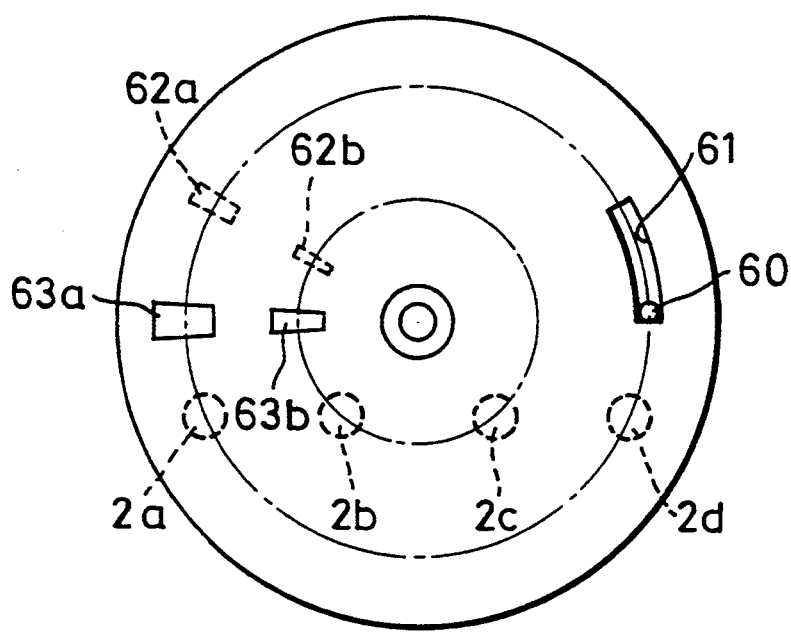
FIG. 7 is a diagram showing the positional relationship between the two shutter disks when the shutter mechanism has been cocked.

For continuously taking scenes of golf swings for example, the shutter button 7 is depressed when a human subject or golf player starts back-swinging and reaches a top position. Upon the depression of the shutter button 7, a release lever 31 causes the stop lever 30 to rotate in the clockwise direction as viewed from FIG. 2 to release the locked state of the shutter drive plate 23. The shutter drive plate 23 is then moved by the charge spring 26 to the left so that the rear shutter disk 13 in the cocked position shown in FIG. 7 is rotated in the counterclockwise direction by means of the rack 24 and the gear 25a.

Figure 8:
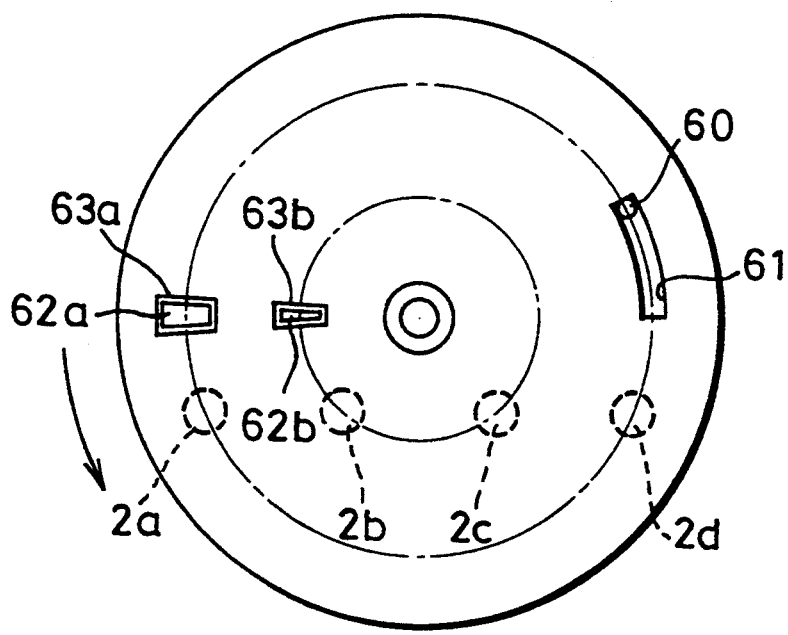
FIG. 8 is a diagram showing the positional relationship between the two shutter disks when sequentially taking scenes.

As the rear shutter disk 13 rotates to the position shown in FIG. 8, the movable shutter openings 62a and 62b, and 63a and 63b are superposed one upon another, and the pin 60 comes into contact with the end 61b of the slot 61. Thereafter, because the pin 60 is in contact with the end 61b, the shutter disks 13 and 14 rotate together in the counterclockwise direction. As the shutter disks 13 and 14 rotate together, the movable shutter openings 62a and 63a first open and close the stationary shutter openings 2a and opening 20a. Next, the movable shutter openings 62b and 63b open and close the stationary shutter opening 2b and opening 20d, and thereafter open and close the stationary shutter opening 2c and opening 20c. Lastly, the movable shutter openings 62a and 63a open and close the stationary shutter opening 2d and opening 20d. In this manner, the images of the consecutive golf swings of a subject are taken on original sub-frames 39a, 39b, 39c and 39d. The shutter disks 13 and 14 rotate a little further and reach the initial position shown in FIG. 9. In this initial position, the stationary shutter openings 2a to 2d and openings 20a to 20d are shielded from light.

After the sequential image taking is completed, the shutter drive plate 23 resumes the initial position shown in FIG. 6. At this time, one end of the shutter drive plate 23 pushes the winding stop lever 49 against the force of the spring 48, so that the winding stop lever 49 is lifted out of the recess 46. As a result, the locked state of the winding wheel 6 is released, allowing the next film winding operation.

Figure 11:
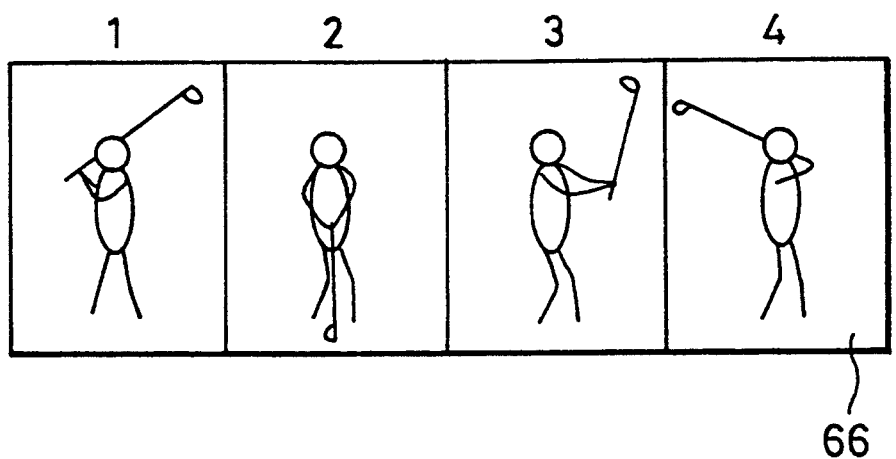
FIG. 11 shows a panoramic photoprint made from a photographic paper with images taken by the sequential taking camera of the present invention.

The photographic film 37 with images taken by the sequential taking camera 2 is of a panoramic size, and so it is subjected to panoramic print development to print a laterally elongated panoramic photoprint 66 such as shown in FIG. 11. Four print sub-frames are printed on this panoramic photoprint 66. Note that serial numbers 1 to 4 shown in FIG. 11 are associated with the photoprint 66 in order to indicate the order of image takings.

Figure 12:
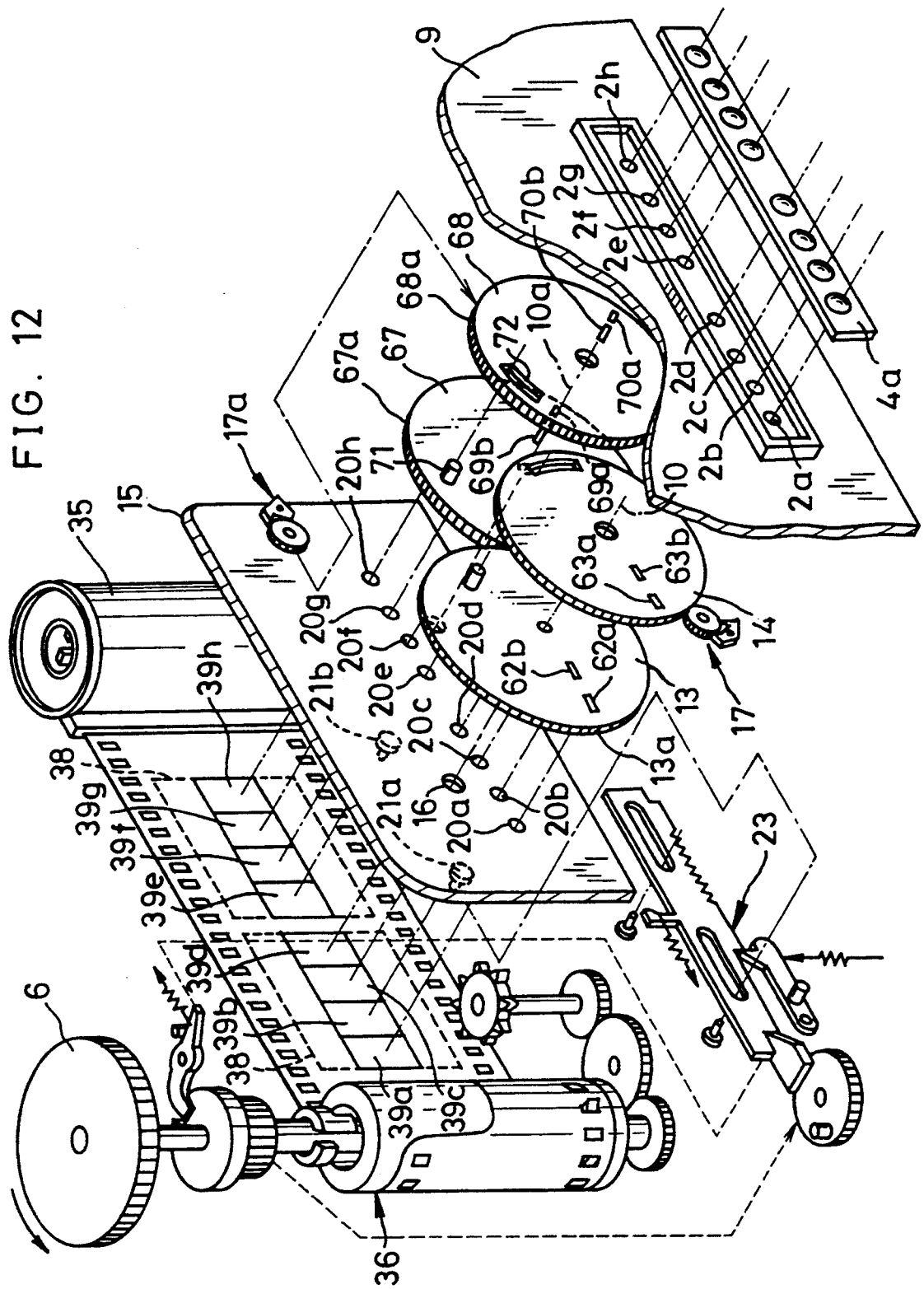
FIG. 12 is an exploded perspective view showing the main parts of a second embodiment of the sequential taking camera with eight taking lenses capable of creating eight original sub-frames.

FIG. 12 shows another embodiment wherein eight original subframes 39a to 39h are taken on two panoramic-size original frames. Like elements to those shown in FIG. 2 are represented by using identical reference numerals. In this embodiment, the distance between the cassette 35 and the film take-up reel 36 is such as to place two full-size original frames therebetween. The front shutter base plate 9 is formed with eight stationary openings 2a to 2h, and a lens plate 4a having eight taking lenses is attached thereto. The shutter box 15 is formed with eight openings 20a to 20h.

Shutter disks 13 and 14 as well as shutter disks 67 and 68 are housed within the shutter box 15. The rear shutter disks 13 and 67 are formed with gears 13a and 67a, respectively, on the outer peripheries thereof. With the gear 13a meshing with the gear 67a, the rear shutter disk 67 is rotated by the rotation of the rear shutter disk 13. A pin 71 on the rear shutter disk 67 slides in a slot 72 formed in the front shutter disk 68, so that the front shutter disk 68 is rotated, with a delay as previously described, by the rotation of the rear shutter disk 67. The shutter disk 67 is formed with a pair of shutter openings 69a and 69b, and the shutter disk 68 is also formed with a pair of shutter openings 70a and 70b, like the shutter disks 13 and 14. The governor 17a meshes with the gear 68a of the shutter disk 68.

The axial shaft 10 for the disks 13 and 14 is located above the stationary openings 20a to 20h, and an axial shaft 10a for the disks 67 and 68 is located below the stationary openings 20e to 20h. This structure makes it possible to perform a sequence of exposure of the subframes 39e to 39h in the same direction as that of exposure of the subflames 39a to 39d.

In this embodiment, as the shutter drive plate 23 moves to the left upon the shutter release operation, the shutter disks 13 and 14 rotate together as described previously. The rotation of the rear shutter disk 13 is transmitted to the rear shutter disk 67, moving them together. The rotation of the rear shutter disk 67 is transmitted to the front shutter disk 68 via the pin 71 and the slot 72, moving them together after a predetermined delay. The two pairs of shutter disks rotate while superposing the shutter openings 62a and 62b on the shutter openings 63a and 63b and while superposing the shutter openings 69a and 69b on the shutter openings 70a and 70b. As described previously, upon rotation of the shutter disks 13 and 14, the stationary shutter openings 2a to 2d are sequentially opened and closed. Thereafter, upon rotation of the shutter disk 67 and 68, the stationary shutter openings 2e to 2h are sequentially opened and closed. As a result, when the shutter release operation is executed once, eight original sub-frames 39a to 39h are sequentially created on the photographic film 37. From the photographic film with images taken by this embodiment of the sequential taking camera, two panoramic photoprints are formed. Eight consecutive scenes can be observed by placing the two photoprints side by side.

Figure 14:
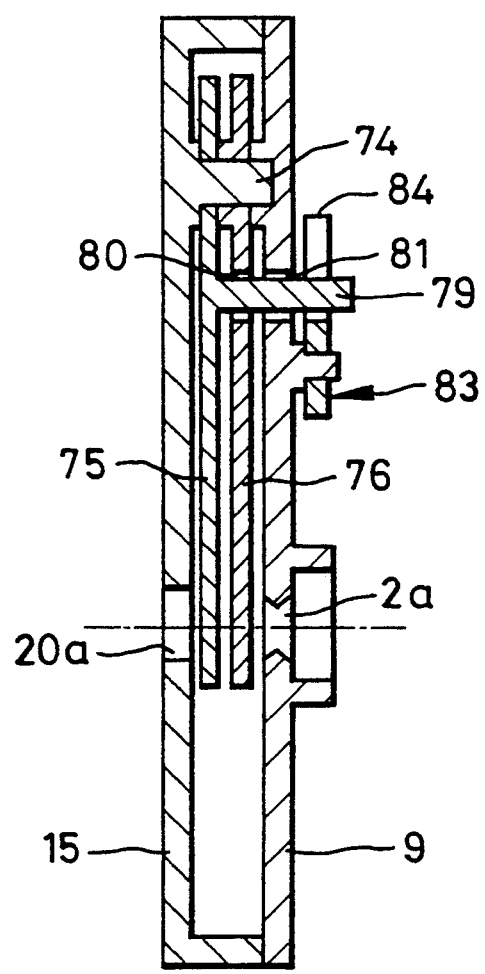
FIG. 14 is a cross sectional view of the shutter base plate and shutter disks shown in FIG. 13.
Figure 13:
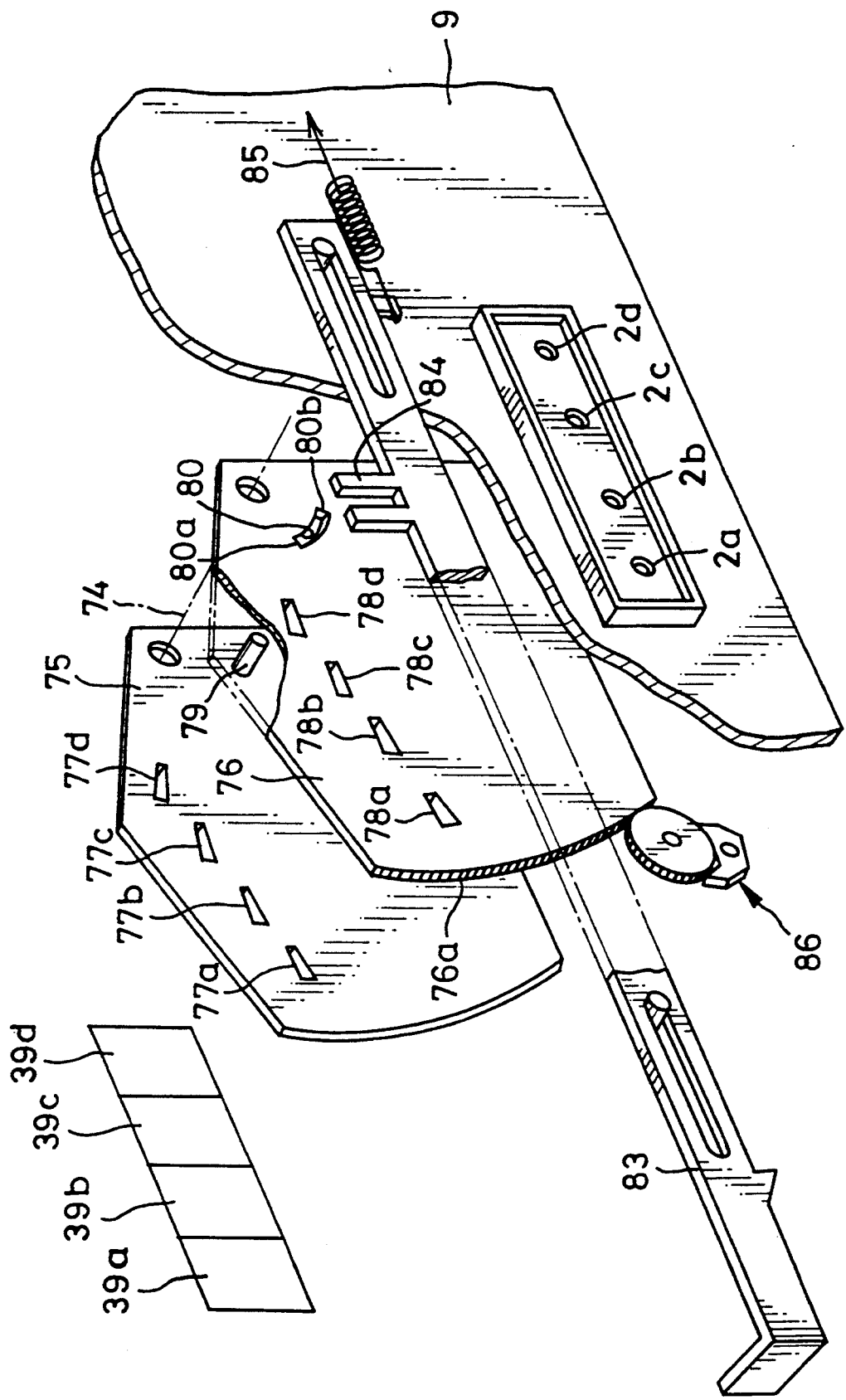
FIG. 13 is an exploded perspective view showing the main parts of a third embodiment of the sequential taking camera with four movable shutter openings for each shutter disk.

FIG. 13 shows another embodiment. In this embodiment, two of shutter disks or plates 75 and 76 each are formed with four movable shutter openings 77a to 77d, and 78a to 78d. The shutter disks 75 and 76 are formed with a pin 79 and slot 80, respectively, similar to the above two embodiments. As shown in FIG. 14, the shutter disks 75 and 76 are housed within a space defined by the shutter base plate 9 and the shutter box 15, and are rotatably supported by the shaft 74. The shutter base plate 9 is formed with a guide slot 81 through which the pin 79 extends.

A shutter drive plat 83 is mounted slidably on the front side of the shutter base plate 9. The shutter drive plate 83 is formed with a fork 84 for holding the pin 79 at its sides without preventing the vertical movement of the pin 79. Therefore, as the shutter drive plate 83 is slid in the lateral direction, the fork 84 can push the pin 79 allowing the latter to slide along the guide slot 81. As the pin 79 slides along the guide slot 81, the front shutter disk 76 rotates. The shutter drive plate 83 is provided with a cocking spring 85 which moves the shutter drive plate 83 to the right as viewed in FIG. 13 during the shutter release operation. Reference numeral 86 represents a governor meshing with the gear a formed on the outer periphery of the front shutter disk 76.

In this embodiment, when the shutter button 7 is depressed, the release bar 31 shown in FIG. 15 is pushed downward to rotate the stop lever 30 in the counterclockwise direction as viewed in FIG. 15. When the stop lever 30 releases the locked state of the shutter drive plate 83, the shutter drive plate 83 slides to the right under the force of the cocking spring 85, and pushes the pin 79 to the right. Therefore, the pin 79 is rotated in the counterclockwise direction along the guide slot 81 to rotate the rear shutter disk 75 in the counterclockwise direction. When the pin 79 moves within the slot 80 and reaches the end 80b, the shutter openings 77a and 78a, the shutter openings 77b and 78b, the shutter openings 77c and 78c, and the shutter openings 77d and 78d, are superposed one upon another, respectively. Thereafter, the shutter disks 77 and 78 rotate together in this state. Therefore, as described previously, the shutter openings 2a to 2d are sequentially opened and closed at a predetermined time interval. In this manner, original frames 39a, 39b, 39c, and 39d are created on the photographic film.

After the sequential image taking is completed, the winding wheel is rotated to feed the photographic film by one frame. At this time, the shutter drive plate 83 is moved to the left against the force o the cocking spring 85, and set to the cocked position. At this time, the fork 84 pushes the pin 79 from the right side thereof to rotate the rear shutter disk 75 in the clockwise direction. During the initial stage of this rotation, the pin 79 slides within the slot 80, maintaining the front shutter disk 76 at that position. As a result, the movable shutter openings 77a and 78a, the movable shutter openings 77b and 78b, the movable shutter openings 77c and 78c, and the movable shutter openings 77d and 78d, are displaced from each other, respectively, without being superposed one upon another. When the pin 79 comes into contact with the end 80a, the shutter disks 75 and 76 rotate together to the cocked position, while maintaining the contact between the pin 79 and the end 80a. Accordingly, the stationary shutter openings 2a to 2d move from the initial position to the cocked position while being light shielded by one of the shutter disks 75 and 76.

A mechanism may be provided which selectively transmits the motion of the shutter drive plate either to the rear shutter disk or to the front shutter disk. With such a mechanism, it is possible to change the rotation direction of the two shutter disks, providing a panoramic photoprint whose scenes change with time from the right to tine left. This arrangement is convenient for taking scenes of golf swings of a left-handed person or a subject moving from right to the left. Furthermore, a governor may be provided which can change the rotation speeds of two shutter disks stepwise, to change the durations of taking images of original sub-frames. A motor may be incorporated in the camera and adapted to winding up the film, and the shutter drive plate may be set in the cocked position in response to the operation of winding up the film.

Although the present invention has been fully described by way of the preferred embodiments thereof with reference to the accompanying drawings, various changes and modifications will be apparent to those of working skill in this field. Therefore, unless otherwise these changes and modifications depart from the scope of the present invention, they should be construed as included therein.

What is claimed is:

1. A sequential taking camera having a plurality of exposure chambers arranged in a line along a photographic film transporting direction and a plurality of taking lenses one mounted in front of each exposure chamber, for sequentially creating a plurality of original frames on a photographic film upon one release operation, said sequential taking camera comprising:

a film winding member for winding up said photographic film one frame after another, said film winding member being operable from the outside of said camera;

shutter drive means moving from an initial position to a cocked position in response to said operation of said film winding member;

shutter release means for releasably retaining said shutter drive means in said cocked position, said shutter release means releasing said shutter drive means in response to actuation of said shutter release means to allow said shutter drive means to move quickly from said cocked position to said initial position;

at least one shutter disk rotating in response to the operation of said shutter drive means, said shutter disk taking a first position when said shutter drive means is in said initial position and taking a second position when said shutter drive means is in said cocked position, and said shutter disk having a plurality of shutter openings which operate to sequentially expose said frames only when said shutter disk rotates from said second position to said first position, said shutter drive means including an elongated shutter drive lever slidable in the direction of its length between said initial and cocked positions, and a spring urging said shutter drive lever toward said initial position.

2. A sequential taking camera according to claim 1, wherein said at least one shutter disk includes a first shutter disk operating in response to the operation of said shutter drive lever, and a second shutter disk disposed in a superposed relation with said first shutter disk, said first shutter disk having a first shutter opening group, and said second shutter disk having a second shutter opening group.

3. A sequential taking camera according to claim 2, further comprising means for allowing said first shutter disk to rotate relative to said second shutter disk within a predetermined angular range, wherein as said first shutter disk rotates from said first position to said second position, said first shutter disk rotates relative to said second shutter disk while maintaining said first and second shutter opening groups out of superposition one upon another so as not to expose said photographic film to light, and as said first shutter disk rotates from sid second position to said first position, said first shutter disk rotates relative to said second shutter disk while maintaining said first and second shutter opening groups superposed with each other so as to expose said photographic film to light.

4. A sequential taking camera according to claim 3, wherein said relative rotation allowing means includes a slot formed in one of said first and second shutter disks, and a pin capable of engaging with said slot and formed on the other of said first and second shutter disks.

5. A sequential taking camera having a plurality of exposure chambers arranged in a line along a photographic film transporting direction and a plurality of taking lenses one mounted in front of each exposure chamber, for sequentially creating a plurality of original frames on a photographic film upon one release operation, said sequential taking camera comprising:

a film winding member for winding up said photographic film one frame after another, said film winding member being operable from the outside of said camera;

shutter drive means moving from an initial position to a cocked position in response to the operation of said film winding member;

shutter release means for releasably retaining said shutter drive means in said cocked position, said shutter release means releasing said shutter drive means In response to actuation of said shutter release means to allow said shutter drive means to move quickly from said cocked position to said initial position;

a first shutter disk rotating in response to the operation of said shutter drive means, said first shutter disk taking a first position when said shutter drive means is in said initial position and taking a second position when said shutter drive means is in said cocked position, and said first shutter disk having a plurality of first shutter openings, a second shutter disk disposed in superposed relation with said first shutter disk, said second shutter disk being driven in rotation by said first shutter disk in the same direction of rotation as said first shutter disk, and said second shutter disk having a plurality of second shutter openings corresponding to said plurality of first shutter openings; and means for allowing said first shutter disk to rotate relative to said second shutter disk within a predetermined angular range while said second shutter disk remains stationary, wherein as said first shutter disk rotates from said first position to said second position, said first shutter disk rotates relative to said second shutter disk while said second shutter disk remains stationary and thereafter drives said second shutter disk in the same direction of rotation as said first shutter disk while maintaining said plurality of first and second shutter openings out of superposition with each other so as not to expose said photographic film to light, and as said first shutter disk rotates from said second position to said first position, said first shutter disk rotates relative to said second shutter disk while said second shutter disk remains stationary until said plurality of first and second shutter openings become superposed with each other and thereafter said first shutter disk drives said second shutter disk in rotation in the same direction of rotation as said first shutter disk while maintaining said plurality of first and second shutter openings superposed with each other so as to sequentially expose said frames.

6. A sequential taking camera according to claim 5, wherein said shutter drive means includes a slidable shutter drive lever and a spring for urging said shutter drive lever toward said initial position.

7. A sequential taking camera according to claim 5, wherein said relative rotation allowing means includes a pin formed on said first shutter disk, and a slot receiving said pin and formed in said second shutter disk.

8. A sequential taking camera according to claim 5, wherein said first shutter disk has a pinion formed on a rotary shaft thereof, and said shutter drive plate has a rack adapted to mesh with said pinion.

9. A sequential taking camera according to claim 5, further comprising a first governor for making constant the rotation speed of said second shutter disk.

10. A sequential taking camera according to claim 5, further comprising third and fourth shutter disks corresponding respectively to said first and second shutter disks and rotating in response to the rotation of said first and second shutter disks, said first to fourth disks operating to sequentially create 4N said original frames on two said panoramic size original frames.

11. A sequential taking camera according to claim 10, further comprising a governor for making constant the rotation speed of said fourth shutter disk.

12. A sequential taking camera according to claim 7, wherein the numbers of said plurality of first and second movable shutter openings each are 2N, wherein N is an integer, said 2N movable shutter openings being arranged at different rotational radii on said shutter disks.

13. A sequential taking camera according to claim 7, wherein said first shutter disk has a fork adapted to hold said pin.

14. A sequential taking camera according to claim 5, further comprising a governor for making constant the rotational speed of said second disk.

15. A sequential taking camera comprising:
means for moving a photographic film along a photographic film transporting direction;
first and second shutter disks mounted rotatably in an exposure direction and in a cocking direction;
a plurality of shutter disk openings for sequentially registering with sequential frames on said film to expose said photographic film to light, said plurality of shutter disk openings being formed in said first and second shutter disks;
a spring for urging said first shutter disk in said exposure direction;
release means for releasing said first shutter disk and allowing said first shutter disk to rotate in said exposure direction, in response to a release operation;
shutter setting means for rotating said first shutter disk in said cocking direction against the force of said spring in response to a film winding operation; and
operating means for rotating said second shutter disk subsequent to the onset of rotation of said first shutter disk, said operating means causing said plurality of shutter openings in said first and second shutter disks to superpose upon each other when said first shutter disk rotates in said exposure direction and causing said plurality of shutter openings formed in said first shutter disk to be light shielded by said second shutter disk when said first shutter disk rotates in said cocking direction.

16. A sequential taking camera having a plurality of exposure chambers arranged in a line along a photographic film transporting direction and a plurality of taking lenses one mounted in front of each exposure chamber, for sequentially creating a plurality of original frames on a photographic film upon one release operation, said sequential taking camera comprising:
a film winding member for winding up said photographic film one frame after another, said film winding member being operable from the outside of said camera;
shutter drive means moving from an initial position to a cocked position in response to the operation of said film winding member;
shutter release means for releasably retaining said shutter drive means in said cocked position, said shutter release means releasing said shutter drive means in response to actuation of said shutter release means to allow said shutter drive means to move quickly from said cocked position to said initial position;
a first shutter member moving in response to the operation of said shutter drive means, said first shutter member taking a first position when said shutter drive means is in said initial position and taking a second position when said shutter drive means is in said cocked position, and said first shutter member having a plurality of first shutter openings,
a second shutter member disposed in superposed relation with said first shutter member, said second shutter member being driven in movement by said first shutter member in the same direction as said first shutter member, and said second shutter member having a plurality of second shutter openings corresponding to said plurality of first shutter openings; and
means for allowing said first shutter member to move relative to said second shutter member within a predetermined range of movement while said second shutter member remains stationary, wherein as said first shutter member moves from said first position to said second position, said first shutter member moves relative to said second shutter member while said second shutter member remains stationary and thereafter drives said second shutter member in the same direction as said first shutter member while maintaining said plurality of first and second shutter openings out of superposition with each other so as not to expose said photographic film to light, and as said first shutter member moves from said second position to said first position, said first shutter member moves relative to said second shutter member while said second shutter member remains stationary until said plurality of first and second shutter openings become superposed with each other and thereafter said first shutter member drives said second shutter member in the same direction as said first shutter member while maintaining said plurality of first and second shutter openings superposed with each other so as to sequentially expose said frames.

17. A sequential taking camera comprising:

means for moving a photographic film along a photographic film transporting direction;

first and second shutter members mounted for movement in an exposure direction and in a cocking direction;

a plurality of shutter member openings for sequentially registering with sequential frames on said film to expose said photographic film to light, said plurality of shutter member openings being formed in said first and second shutter members;

a spring for urging said first shutter member in said exposure direction;

release means for releasing said first shutter member and allowing said first shutter member to move in said exposure direction, in response to a release operation;

shutter setting means for moving said first shutter member in said cocking direction against the force of said spring in response to a film winding operation; and operating means for moving said second shutter member subsequent to the onset of movement of said first shutter member, said operating means causing said plurality of shutter openings in said first and second shutter members to superpose upon each other when said first shutter member moves in said exposure direction and causing said plurality of shutter openings formed in said first shutter member to be light shielded by said second shutter member when said first shutter member moves in said cocking direction.

18. A sequential taking camera according to claim 1, further comprising a shutter base plate disposed between said plurality of exposure chambers and said plurality of taking lenses and having a plurality of stationary shutter openings formed in alignment with said plurality of taking lenses, said plurality of shutter openings operating to sequentially open and close said plurality of spaced-shutter openings only when said shutter rotates from said second position to said first position.

19. A sequential taking camera according to claim 16, further comprising a shutter base plate disposed between said plurality of exposure chambers and said plurality of taking lenses and having a plurality of stationary shutter openings formed in alignment with said plurality of taking lenses, said plurality of first and second shutter openings when superposed with each other sequentially opening and closing said stationary shutter openings to expose said frames.

20. A sequential taking camera according to claim 17, a plurality of stationary shutter openings arranged in a line, said plurality of shutter members and said first and second shutter members when superposed upon each other permitting light sequentially to pass through said stationary shutter openings and forming on said photographic film a sequential series of exposed frames.

* * * * *